US007397803B2

(12) United States Patent
Love et al.

(10) Patent No.: US 7,397,803 B2
(45) Date of Patent: Jul. 8, 2008

(54) METHOD OF DYNAMIC TRANSMIT SCHEDULING USING CHANNEL QUALITY FEEDBACK

(75) Inventors: Robert T. Love, Barrington, IL (US); Ron Rotstein, Arlington Heights, IL (US); Mark C. Cudak, McHenry, IL (US); Brian K. Classon, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 505 days.

(21) Appl. No.: 10/886,962

(22) Filed: Jul. 8, 2004

(65) Prior Publication Data
US 2005/0003847 A1 Jan. 6, 2005

Related U.S. Application Data

(62) Division of application No. 09/840,538, filed on Apr. 23, 2001, now abandoned.

(60) Provisional application No. 60/202,632, filed on May 9, 2000.

(51) Int. Cl.
*H04L 12/56* (2006.01)

(52) U.S. Cl. .................. 370/395.4; 370/230; 370/329; 370/431; 370/543; 455/10; 455/450; 455/452.1; 455/452.2; 455/504

(58) Field of Classification Search .......... 455/9, 455/10, 62, 63.1, 67.11, 67.13, 423, 452.1, 455/452.2, 453, 504, 505, 506, 512, 343.4, 455/450; 370/230, 329, 358, 391, 395.4, 370/395.64, 395.65, 543, 431
See application file for complete search history.

(56) References Cited

U.S. PATENT DOCUMENTS

| 5,309,503 | A | * | 5/1994 | Bruckert et al. | .......... 455/452.2 |
|---|---|---|---|---|---|
| 5,327,576 | A | * | 7/1994 | Uddenfeldt et al. | .......... 370/333 |
| 5,345,598 | A | * | 9/1994 | Dent | .......... 455/522 |
| 5,687,162 | A | * | 11/1997 | Yoshida et al. | .......... 370/203 |
| 5,956,649 | A |   | 9/1999 | Mitra et al. |   |
| 5,999,534 | A | * | 12/1999 | Kim | .......... 370/395.42 |
| 6,023,623 | A | * | 2/2000 | Benkner et al. | .......... 455/452.2 |
| 6,052,594 | A | * | 4/2000 | Chuang et al. | .......... 455/450 |

(Continued)

FOREIGN PATENT DOCUMENTS

WO    WO 96/02980 A1    2/1996

(Continued)

OTHER PUBLICATIONS

"Universal Mobile Telecommunications System (UMTS); Requirements for Support of Radio Ressource Management (TTD) (TDD?) (3G TS 5.123 Version 3.0.0 Release 1999)" ETSI 3G TS 125 123 V3.0.0 REL. 1999, [Online] Feb. 5, 2000, pp. 15-16.

(Continued)

*Primary Examiner*—William Trost
*Assistant Examiner*—James D Ewart

(57) ABSTRACT

A method and system for dynamic rate switching via medium access channel layer signaling is disclosed, wherein data rates for high data rate channels are automatically shifted up or down based on a predetermined metric. In a preferred embodiment, data rates are automatically shifted up or down based on transmit channel gain required to maintain a required signal to noise ratio.

15 Claims, 6 Drawing Sheets

U.S. PATENT DOCUMENTS

| | | | | |
|---|---|---|---|---|
| 6,069,883 | A * | 5/2000 | Ejzak et al. | 370/335 |
| 6,108,316 | A * | 8/2000 | Agrawal et al. | 370/311 |
| 6,134,220 | A * | 10/2000 | Le Strat et al. | 370/252 |
| 6,134,230 | A * | 10/2000 | Olofsson et al. | 370/337 |
| 6,167,031 | A * | 12/2000 | Olofsson et al. | 370/252 |
| 6,167,270 | A | 12/2000 | Rezaiifar et al. | |
| 6,229,795 | B1 | 5/2001 | Pankaj et al. | |
| 6,240,125 | B1 | 5/2001 | Andersson et al. | |
| 6,289,217 | B1 * | 9/2001 | Hamalainen et al. | 455/425 |
| 6,307,844 | B1 | 10/2001 | Tsunehara et al. | |
| 6,335,922 | B1 * | 1/2002 | Tiedemann et al. | 370/335 |
| 6,374,112 | B1 * | 4/2002 | Widegren et al. | 455/452.2 |
| 6,396,867 | B1 * | 5/2002 | Tiedemann et al. | 375/141 |
| 6,442,146 | B1 | 8/2002 | Onodera et al. | |
| 6,493,331 | B1 * | 12/2002 | Walton et al. | 370/341 |
| 6,512,752 | B1 * | 1/2003 | H'mimy et al. | 370/329 |
| 6,526,062 | B1 * | 2/2003 | Milliken et al. | 370/395.42 |
| 6,542,742 | B2 * | 4/2003 | Schramm et al. | 455/436 |
| 6,546,017 | B1 * | 4/2003 | Khaunte | 370/412 |
| 6,603,753 | B1 * | 8/2003 | Bedekar et al. | 370/335 |
| 6,608,827 | B1 * | 8/2003 | Austin | 370/348 |
| 6,697,640 | B1 * | 2/2004 | Katz et al. | 455/561 |
| 6,748,233 | B1 * | 6/2004 | Arnold et al. | 455/522 |
| 6,965,590 | B1 * | 11/2005 | Schmidl et al. | 370/343 |
| 2001/0000168 | A1 * | 4/2001 | Esmailzadeh et al. | 455/522 |
| 2001/0001764 | A1 * | 5/2001 | Davarian et al. | 455/522 |
| 2001/0029189 | A1 * | 10/2001 | Mandyam | 455/522 |
| 2001/0030956 | A1 * | 10/2001 | Chillariga et al. | 370/348 |
| 2001/0033560 | A1 * | 10/2001 | Tong et al. | 370/337 |
| 2001/0038630 | A1 * | 11/2001 | Tong et al. | 370/395 |

FOREIGN PATENT DOCUMENTS

| | | |
|---|---|---|
| WO | WO 98/35514 | 8/1998 |
| WO | WO 99/12302 | 3/1999 |
| WO | WO 99/23844 | 5/1999 |
| WO | WO 01/71926 A2 | 9/2001 |

OTHER PUBLICATIONS

"Feasibility study of Advanced techniques for High Speed Downlink Packet Access" ETSI 3GPP TSG RAN WG1 TSGR1#12-556, [Online] Apr. 13, 2000, pp. 1-5.

* cited by examiner

METHOD OF DYNAMIC TRANSMIT SCHEDULING USING CHANNEL QUALITY FEEDBACK

FIELD OF THE INVENTION

The present invention is related in general to communication systems, and, more particularly, to an improved method and system for dynamic scheduling via channel quality feedback.

BACKGROUND OF THE INVENTION

Standards bodies such as the International Standards Organization (ISO) have adopted a layered approach for the reference model of a communication subsystem. The complete communication subsystem is broken down into a number of layers, each of which performs a well-defined function in the context of the overall communication subsystem. It operates according to a defined protocol by exchanging messages, both user data and additional control information, with a corresponding peer layer in a remote system. Each layer has a well-defined interface between itself and the layer immediately above and below. Consequently, the implementation of a particular protocol layer is independent of all other layers. The function of each layer is specified formally as a protocol that defines the set of rules and conventions used by the layer to communicate with a similar peer layer in another (remote) system. Each layer provides a defined set of services to the layer immediately above. It also uses the services provided by the layer immediately below it to transport the message units associated with the protocol to the remote peer layer.

Communication systems, such as Code Division Multiple Access (CDMA) systems, communicate messages between infrastructure equipment and subscriber or mobile units. As used herein, a forward or downlinik channel refers to data generated by cellular infrastructure equipment and transmitted for reception by a mobile communication unit, and a reverse or uplinik channel refers to data generated by a mobile communication unit, such as a mobile cellular phone and transmitted for reception by the cellular infrastructure equipment, specifically a base station.

At the most basic level, cdma2000 provides protocols and services that correspond to the bottom two layers of the ISO/OSI Reference Model (i.e., Layer 1—the Physical Layer, and Layer 2—the Link Layer) according to the general structure specified by the ITU for IMT-2000 systems. In cdma2000, a generalized multi-media service model is supported. This allows a combination of voice, packet data, and circuit data services to be operating concurrently (within the limitations of the air interface system capacity). Cdma2000 also includes a Quality of Service (QOS) control mechanism to balance the varying QOS requirements of multiple concurrent services.

One problem associated with the combination of voice, packet data, and circuit data services operating concurrently is the ability to maintain a high data rate connection at a required fixed error rate over a channel of varying quality. In addition, maximizing system capacity when high data rate channels are active presents another problem. Consequently, a need exists for a method and system for dynamic rate switching and scheduling control, wherein data rates for high data rate channels are automatically shifted up or down based on a channel quality feedback.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
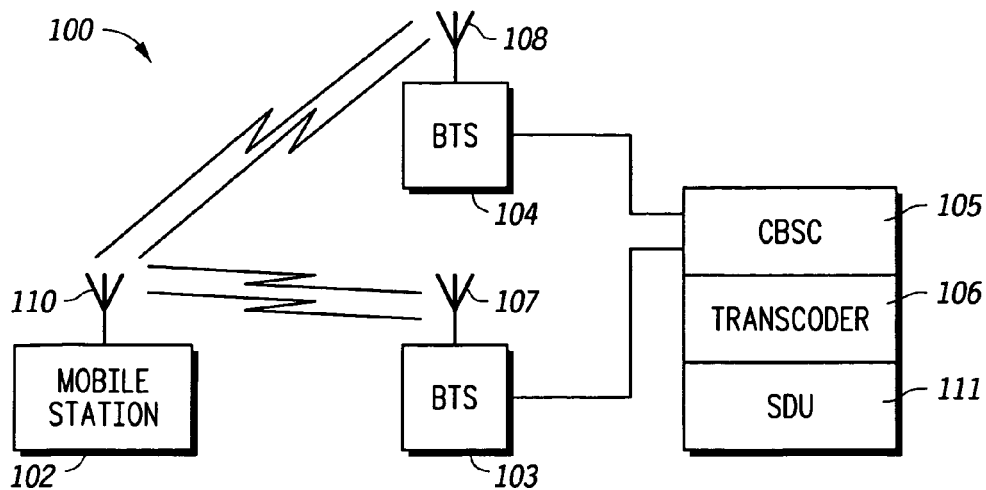
FIG. 1 depicts a communication system in accordance with the method and system of the present invention.

FIG. 1 depicts a communication system 100 in accordance with the preferred embodiment of the present invention. System 100 includes a mobile station 102, a first base transceiver station 104, a second base transceiver station 103, and a Centralized Base Station Controller (CBSC) 105. CBSC 105 includes a transcoder 106, and a selection distribution unit 111. System 100 preferably includes a plurality of mobile stations and base transceiver stations, but only one mobile station and two base transceiver stations are depicted in FIG. 1 for clarity. In a preferred embodiment, system 100 is a Code Division Multiple Access (CDMA) system. System 100 may also be any communication system that transmits signaling messages and requires accurate delivery and receipt by mobile stations.

First base station 104 includes a transceiver 108 that includes a transmitter and a receiver. Second base station 103 includes a transceiver 107 that includes a transmitter and a receiver. Transceivers 107 and 108 transmit, over-the-air, RF signals to be received by mobile unit 102. The transmission is well known in the art, and will not be described further in this application. Signals transmitted from base stations 103 and 104 to mobile unit 102 are referred to herein as forward traffic frames, or as forward link messages. Transceivers 107 and 108 receive messages from mobile unit 102, as is well known in the art. Such messages are referred to herein as reverse link messages.

Mobile unit 102 is preferably a cellular telephone unit that is capable of communicating with base transceiver stations 103 and 104. In a preferred embodiment, mobile unit 102 is a digital cellular CDMA telephone. Mobile unit 102 may also be a wireless data terminal or a videophone. Mobile unit 102 includes a transceiver 110 that includes a transmitter and a receiver, as is well known in the art. Mobile unit 102 communicates with base stations 103 and 104 by transmitting messages by the transceiver 110 located therein on a reverse link, and by receiving messages generated by base stations 103 and 104 at transceiver 110 located therein on the forward link.

In the preferred embodiment of the present invention, BTSs 103 and 104 act as the central location for managing power control in system 100. In an alternate embodiment of the present invention, CBSC 105 manages power control in system 100.

Figure 2:
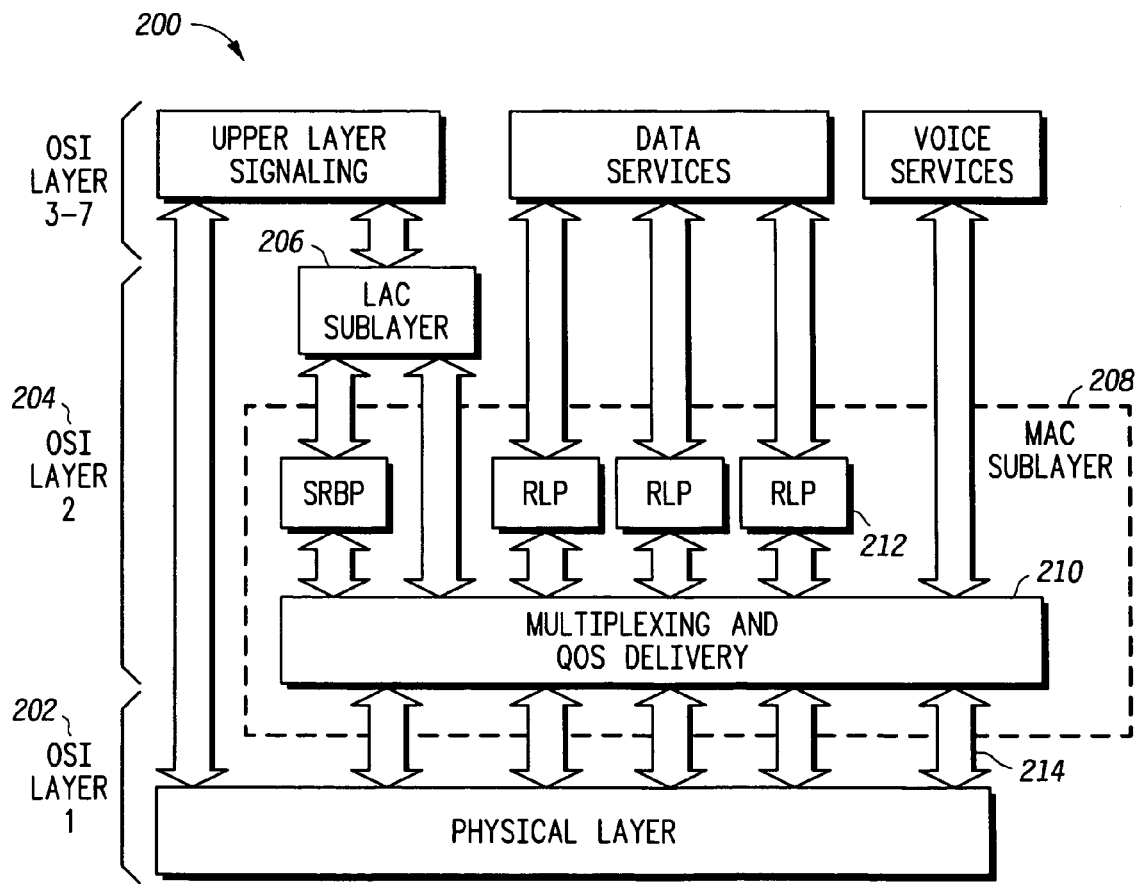
FIG. 2 illustrates a block diagram of a communication system layer structure in accordance with the method and system of the present invention.

FIG. 2 illustrates a block diagram of a communication system layer structure 200 in accordance with the method and system of the present invention. In the preferred embodiment, FIG. 2 illustrates a block diagram of IS-95 and cdma2000 layer structure. However, it will be appreciated by those skilled in the art that other communication systems, such as CDMAOne, UMTS, and ARIB, have similar layer structures. As shown in FIG. 2, IS-95 has a layered structure providing voice, packet data, simple circuit data, and simultaneous voice and packet data services. It should be noted that the term "IS-95" includes any of the standards that are predecessors to cdma2000, i.e. IS-95-A, and TIA/EIA-95-B. At the most basic level, cdma2000 provides protocols and services that correspond to the bottom two layers of the ISO/OSI Reference Model (i.e., Layer 1—the Physical Layer 202, and Layer 2—the Link Layer 204) according to the general structure specified by the ITU for IMT-2000 systems. Layer 2 204 is further subdivided into the Link Access Control (LAC) sublayer 206 and the Medium Access Control (MAC) sublayer 208. In addition, a Quality of service (QOS) control mechanism 210 is included to balance the varying QOS requirements of multiple concurrent services. Applications and upper layer protocols corresponding to OSI Layers 3 through 7 utilize the services provided by the cdma2000 LAC services. Examples include signaling services, voice services, packet data applications (TCP/IP), and circuit data applications.

The design of the cdma2000 LAC and MAC sublayers 206, 208 is motivated by many factors, among those being: the need to support a wide range of upper layer services; the requirement to provide for high efficiency and low latency for data services operating over a wide performance range; support for advanced QOS delivery of circuit and packet data services; and the demand for advanced multi-media services that support multiple concurrent voice, packet data, and circuit data services, each with varying QOS requirements. The cdma2000 MAC sublayer 208 provides two important functions: (1) best effort delivery—reasonably reliable transmission over the radio link with a Radio Link Protocol (RLP) 212 that provides a best effort level of reliability; and (2) multiplexing and QOS control—enforcement of negotiated QOS levels by mediating conflicting requests from competing services and by the appropriate prioritization of access requests. The resolution of these conflicting requirements is handed to a scheduler that prioritizes and prepares the users and system requirements.

In the preferred embodiment, the Mobile Unit transmits channel quality feedback on the Reverse Link, which indicates the measured quality metrics of the forward link. These metrics can be explicit (actual values of channel signal to noise measurements such as C/I), implicit (power control commands) or a mixture of both. The channel quality metrics are fed into the scheduler which indicates the event to the MAC 208. For these applications, portions of the MAC are moved to the Base Stations from the PDG and CBSC 105.

Placing the decision making on the Base Station side of the link, allows for more intelligent scheduling with low latency and fast turn around decision based on the link statistics.

Figure 3:
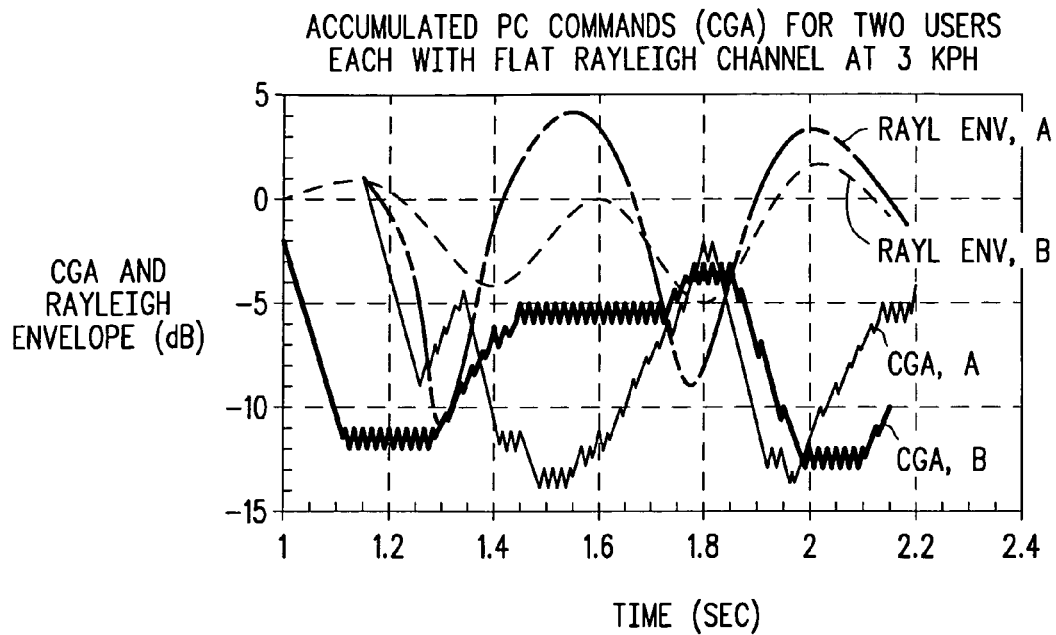
FIG. 3 illustrates a fading profile of a typical wireless communication channel.

FIG. 3. The power control command behavior given rayleigh faded channel at 3 kph with 800 Hz feedback.

Figure 4:
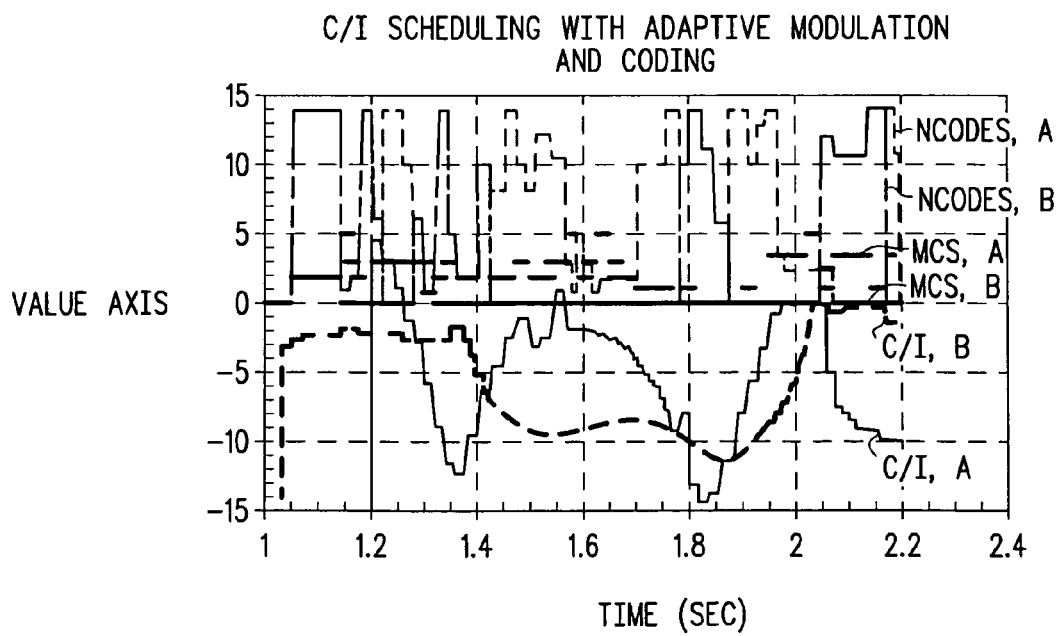
FIG. 4. Scheduling based on C/I measurements provided by each remote unit A and B.

FIG. 4. Scheduling based on C/I measurements provided by each remote unit A and B. In the preferred embodiment of the present invention the scheduling may be for a common channel (such as a pilot channel) shared by a plurality of mobile units. The remote unit reporting the strongest C/I is scheduled first, where the actual modulation (QPSK, 16QAM, 64QAM) and the encoding rate used (½ or ¾) is determined by the strength of the C/I and other metrics available at the basestation indicating the available bandwidth for each remote unit. If enough bandwidth is available and the remote unit's C/I are strong enough then both can be scheduled for the same time interval using separate orthogonal codes.

Figure 5:
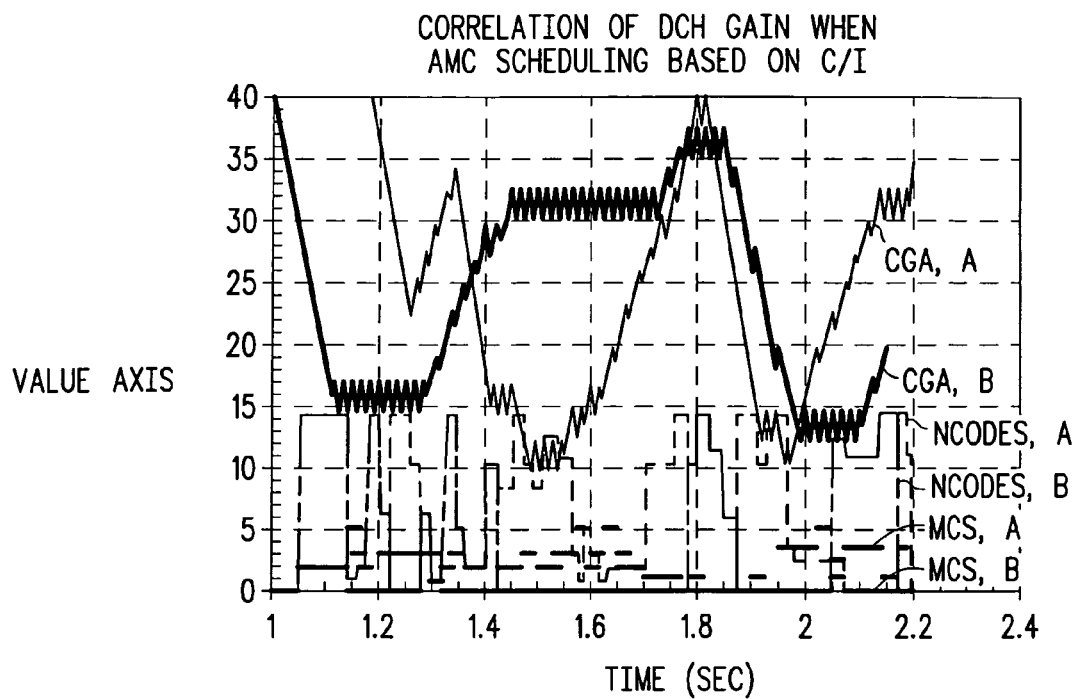
FIG. 5. Shows that the forward dedicated control channel (DCH) voltage gain levels of remote unit A and B can be used to determine scheduling priority on the common channel.

FIG. 5. Shows that the forward dedicated control channel (DCH) voltage gain levels of remote unit A and B can be used to determine scheduling priority on the common channel due to the high correlation of the gain with the reported C/I measurements (see FIG. 5). Scheduling the remote unit with the lowest DCH voltage gain is similar to scheduling based on C/I measurements passed from the remote units.

Figure 6:
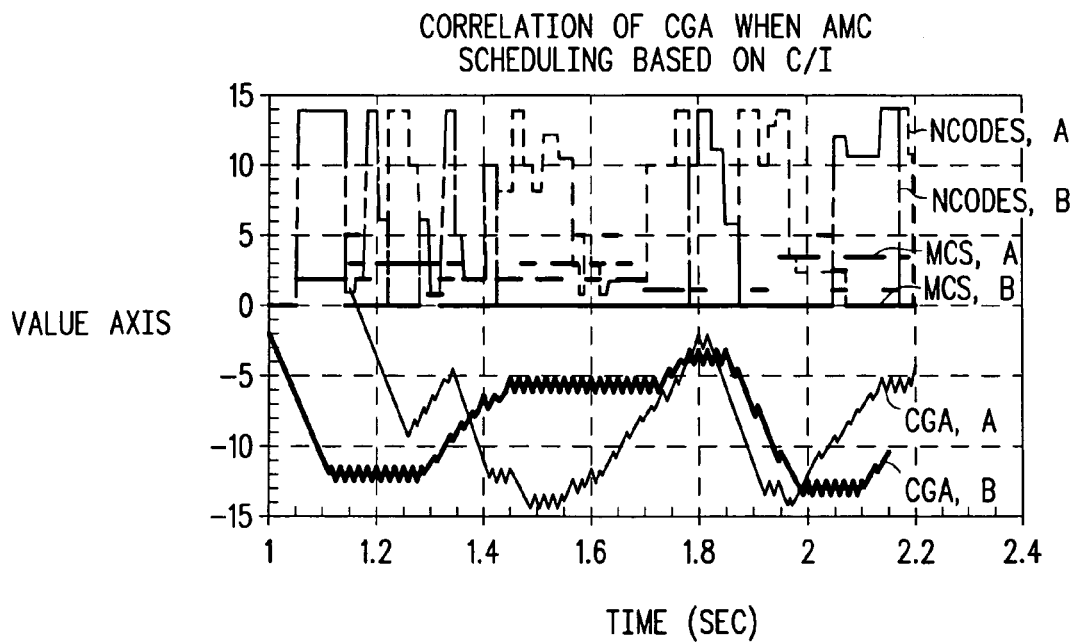
FIG. 6. Shows that the accumulation of power control commands (also called the closed loop gain adjustment (CGA)) of the forward dedicated control channel (DCH) of remote unit A and B.

FIG. 6. Shows that the accumulation of power control commands (also called the closed loop gain adjustment (CGA)) of the forward dedicated control channel (DCH) of remote unit A and B can be used to determine scheduling priority on the common channel due to the high correlation of the CGA level with the reported C/I measurements (see FIG. 5).). Scheduling the remote unit with the lowest CGA is similar to scheduling based on C/I measurements passed from the remote units.

Figure 7:
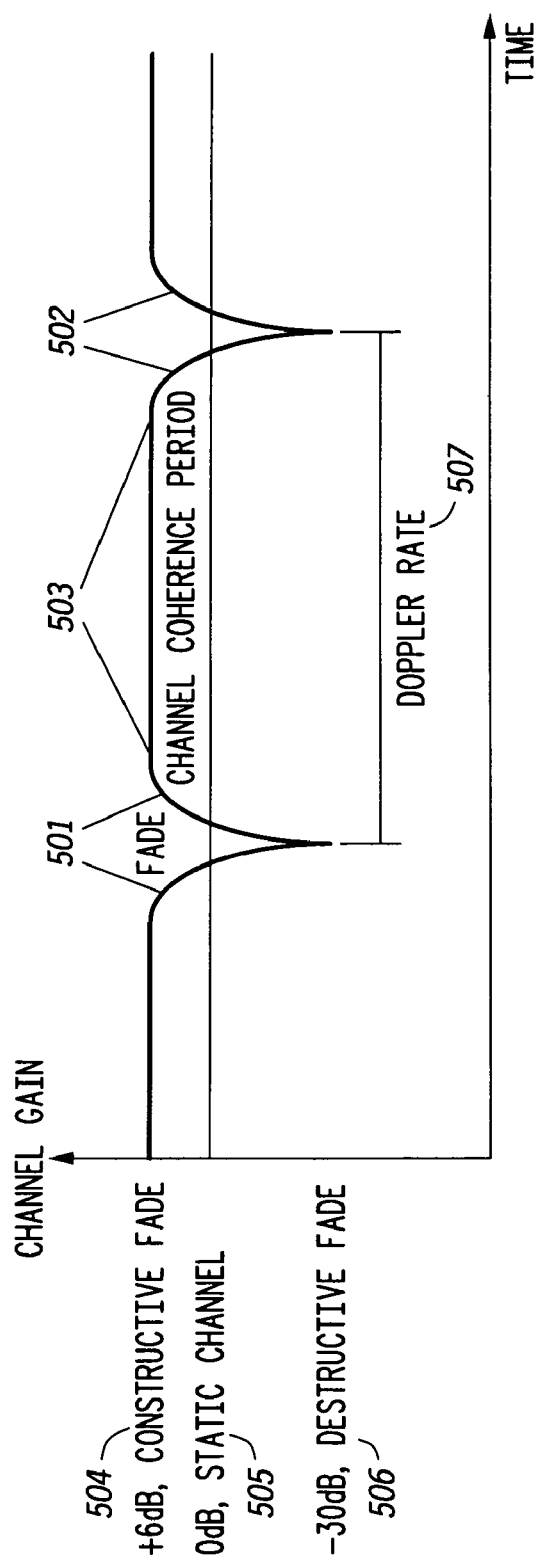
FIG. 7 illustrates the nature of the channel statistics and important channel metrics.

FIG. 7. illustrates the different link fading parameters which in accordance with the method and system of the present invention. The scheduler uses these parameter to define its internal processing. For example, the Doppler rate 507 is used to define the fading mode (slow, medium, fast) which is used in the scheduling process and the channel coherence period 503 is used to determine the scheduling window for a given Mobile Station. It is noted that the actual channel gain during a constructive fade 504 is higher than the static channel reference point 505 by about 3-6 db. As a result, scheduling a transmission only during the constructive fade will provide a net gain during this packet.

Figure 8:
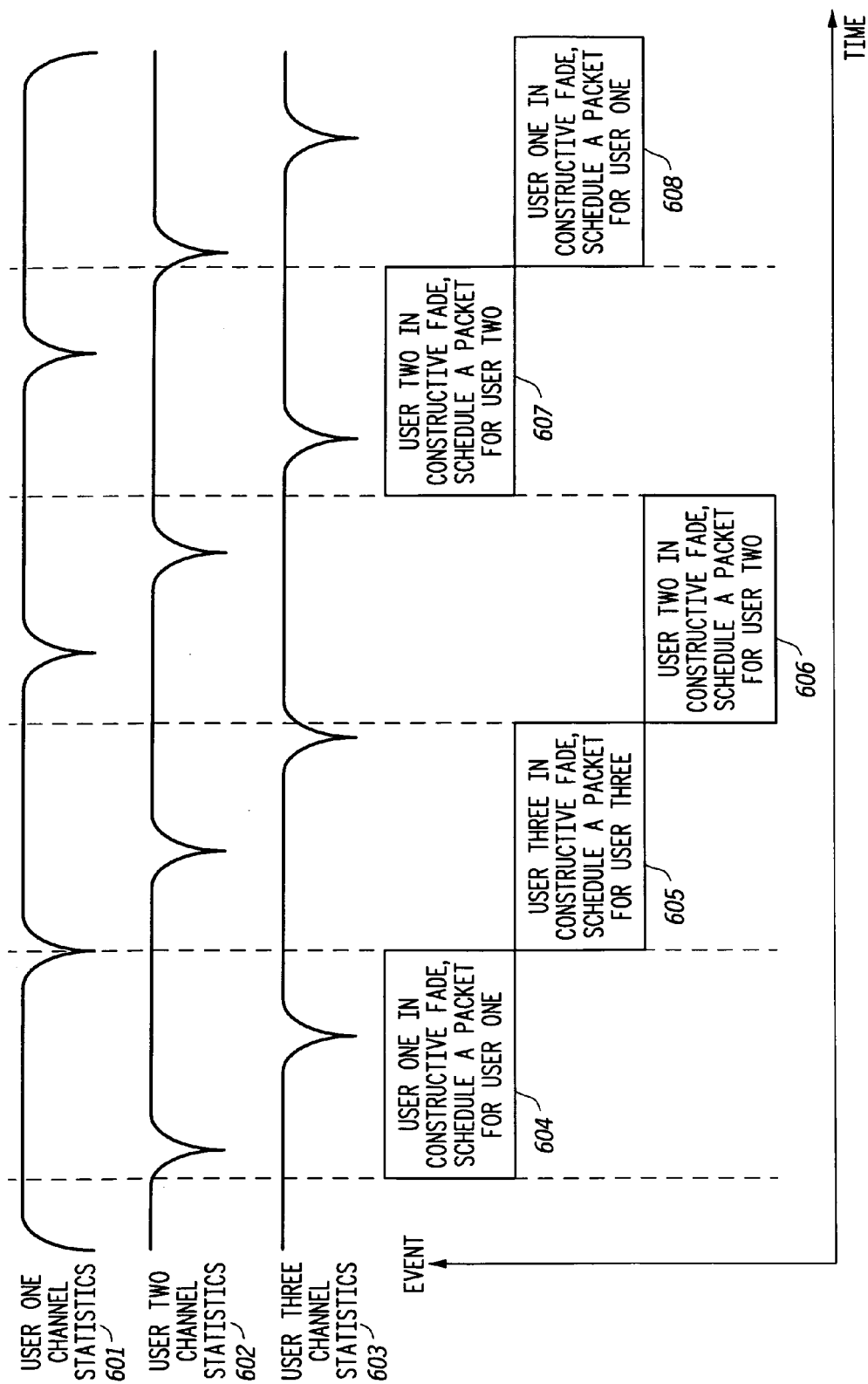
FIG. 8 illustrates an example of scheduling a plurality of users based on the channel statistics in accordance with the method and system of the present invention.

FIG. 8 illustrates the input to the scheduler from three different Mobile Stations 601,602 and 603; each subject to a different fade condition. The scheduler realizes that user one is in constructive fade at the beginning of the coherence time, and assigns the highest priority to packets directed to this user during the time slot 604. For time slot 605, the scheduler gives the highest priority to user three. During timeslot 606, the scheduler did not realize yet that user three is in a constructive fade, so the priority is assigned to user two, however the scheduler realizes that user two is well into the coherence period, and a fade is likely to happen within the 606 time slot. As a result the user two is assigned a lower transmission rate during 606 to allow for the higher possibility of a fade in this time slot. During time slot 607, the scheduler assigns the channel again to user two, but this time at full rate as no fade is expected. During time slot 608, the channel is assigned to user one.

Figure 9:
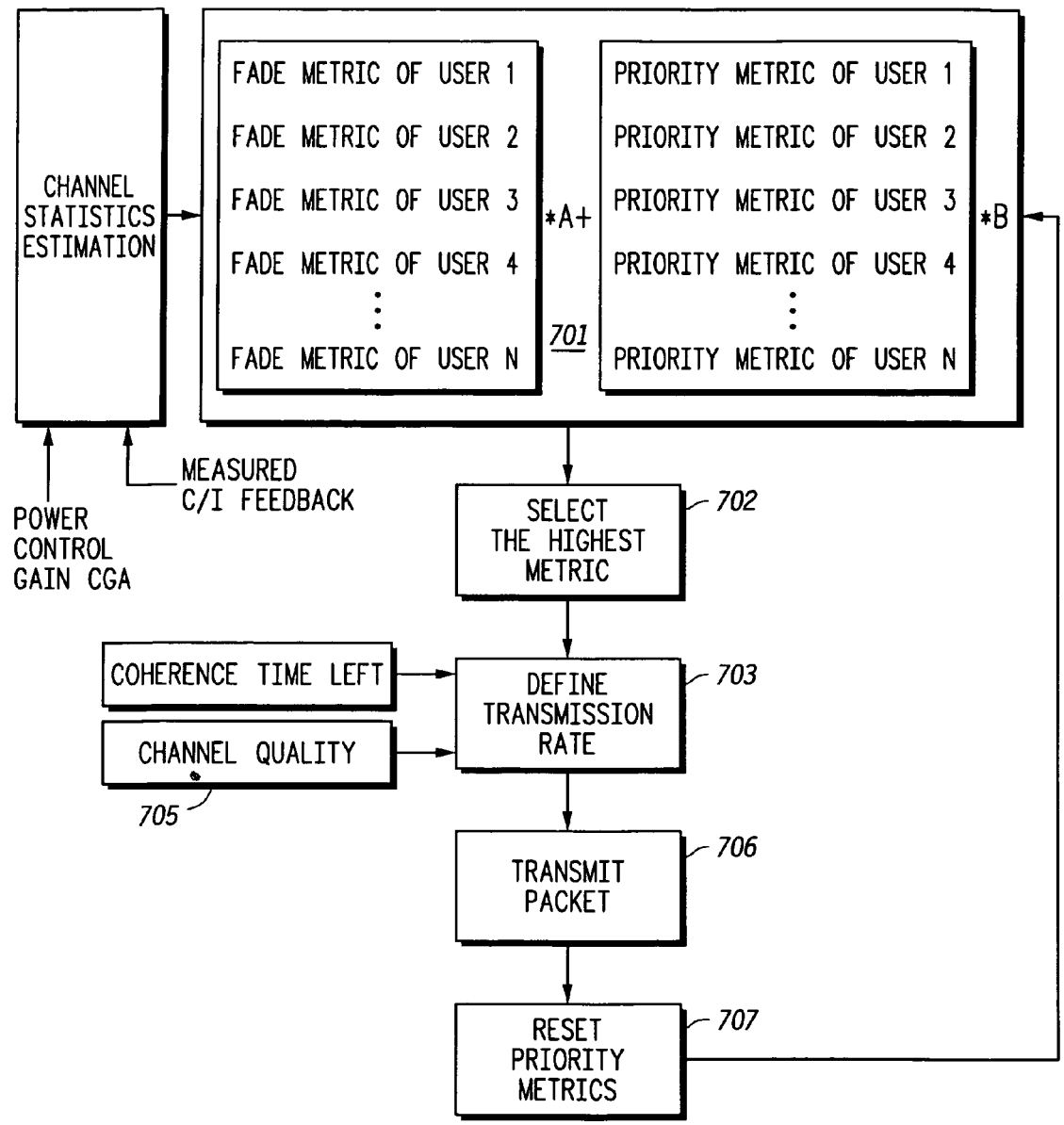
FIG. 9 illustrates a functional flow diagram depicting the process of base transceiver station transmit scheduling for a plurality of users in accordance with the method and system of the present invention.

FIG. 9 illustrates a flow chart detailing how the channel data is processed accordance with the method and system of the present invention. In the metric calculation module 701, the probability of the channel being in a constructive fade is scaled by a programmable parameter 'A' and combined with a priority Metric scaled by a programmable parameter 'B'. The Priority metric is a result of the time a packet is waiting in the transmission Que. The longer the wait time, the higher the priority for a given packet to be selected regardless of the channel conditions. Following the metric generation 701, the scheduler selects the highest metric in the metric selector 702. One the packet to be transmitted, or Mobile station to be serviced is known, the rate determination 703 defines which rate to use based on the channel conditions 705 and the coherence time left in the fade cycle 706. The packet is transmitted in block 706. Block 707 resets the priority counters and the scheduling sequence starts all over again.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for scheduling a plurality of mobile units for data transmission, the method comprising the steps of:
   determining a plurality of mobile units that require data transmission;
   determining a metric for each of the plurality of mobile units that require data transmission;
   selecting, based on the metric, a mobile unit from the plurality of mobile units that require data transmission;
   determining a transmission rate based on channel conditions and a coherence time left in a fade cycle, wherein determining the transmission rate comprises determining a reduced transmission rate when the coherence time left in the fade cycle indicates that a fade is probable; and
   transmitting a packet at the transmission rate to the mobile unit selected.

2. A method for scheduling a plurality of mobile units for data transmission, the method comprising the steps of:
   determining a plurality of mobile units that require data transmission;
   determining power control feedback information for each mobile unit within the plurality of mobile units that require data transmission;
   scheduling the plurality of mobile units for data transmission based on their power control feedback information, wherein scheduling comprises prioritizing at least one mobile unit of the plurality of mobile units over at least one other mobile unit of the plurality of mobile units for data transmission and wherein the power control feedback information comprises a voltage gain setting of a forward dedicated channel;
   determining a metric for each of the plurality of mobile units that require data transmission;
   selecting, based on the metric, a mobile unit from the plurality of mobile units that require data transmission;
   determining a transmission rate based on channel conditions and a coherence time left in a fade cycle, wherein determining the transmission rate comprises determining a reduced transmission rate when the coherence time left in the fade cycle indicates that a fade is probable; and
   transmitting a packet at the transmission rate to the mobile unit selected.

3. The method of claim 2 further comprises the step of determining C/I information for each mobile unit within the plurality of mobile units and scheduling the plurality of mobile units additionally based on C/I.

4. The method of claim 3 wherein the step of determining C/I information for each mobile unit comprises the step of determining feedback information of a common channel.

5. The method of claim 2 wherein the step of scheduling the plurality of mobile units for data transmission comprises the step of scheduling the plurality of mobile units for data transmission over a common channel shared by the plurality of mobile units.

6. The method of claim 2 wherein the metric includes a priority metric based on a time a packet is queued.

7. The method of claim 2 wherein the power control feedback information comprises an accumulation of power control commands.

8. An apparatus for scheduling mobile units for data transmission, the apparatus comprising:
   a channel statistic estimator, wherein the channel statistic estimator has power control information for a plurality of mobile units as an input and outputs a power-control statistic based on the power control information;
   a scheduler having the power-control statistic as an input and outputting scheduled mobile units based on the power control statistic, wherein the scheduled mobile units comprises at least one mobile unit of the plurality of mobile units being prioritized over at least one other mobile unit of the plurality of mobile units for data transmission and wherein the power-control statistic comprises a voltage gain setting of a forward dedicated channel;
   means for determining a metric for each of the plurality of mobile units;
   means for selecting, based on the metric, a mobile unit from the plurality of mobile units;
   means for determining a transmission rate based on channel conditions and a coherence time left in a fade cycle, wherein the means for determining the transmission rate comprises a means for determining a reduced transmission rate when the coherence time left in the fade cycle indicates that a fade is probable; and
   a transmitter adapted to transmit a packet at the transmission rate to the mobile unit selected.

9. The apparatus of claim 8 wherein the channel statistic estimator additionally has C/I feedback information for the plurality of mobile units as an input and outputs a statistic based on both power control and C/I information for each mobile unit.

10. The apparatus of claim 9 wherein the C/I information is C/I feedback information for a common channel shared by the plurality of mobile units.

11. The apparatus of claim 8 wherein the power control information comprises an accumulation of power control commands.

12. A method for scheduling a plurality of mobile units for data transmission, the method comprising the steps of:
   determining a plurality of mobile units that require data transmission;
   determining a fading metric for each of the plurality of mobile units that require data transmission;

determining a priority metric based on a time a packet is queued for each of the plurality of mobile units that require data transmission;

selecting, based on the fading metric and the priority metric, a mobile unit from the plurality of mobile units that require data transmission;

determining a reduced transmission rate when a coherence time left in a fade cycle indicates that a fade is probable; and transmitting a packet at the reduced transmission rate to the mobile unit selected.

13. The method of claim 12 wherein the fading metric is based on a voltage gain setting of a forward dedicated channel.

14. The method of claim 12 wherein the fading metric is based on an accumulation of power control commands.

15. The method of claim 12 wherein the fading metric is based on measured C/I feedback.

* * * * *